Sept. 7, 1965 G. E. JOHNSTON ETAL 3,205,335
METHOD AND APPARATUS FOR ACCURATELY
MACHINING HOBS AND THE LIKE
Filed June 18, 1962 4 Sheets-Sheet 1
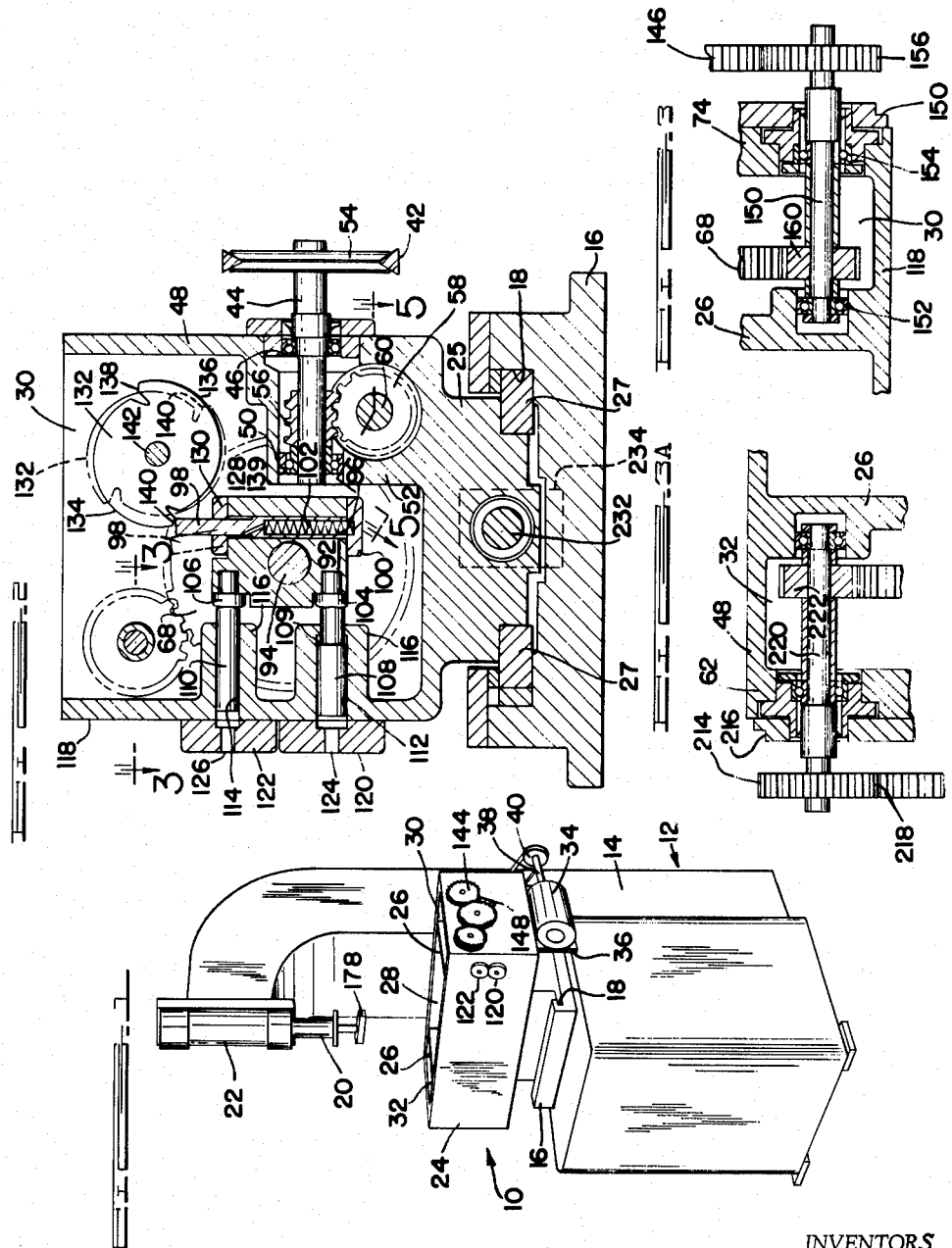
INVENTORS
GLEN E. JOHNSTON
MEREDITH M. WINDSOR
BY
OLSEN AND STEPHENSON
ATTORNEYS

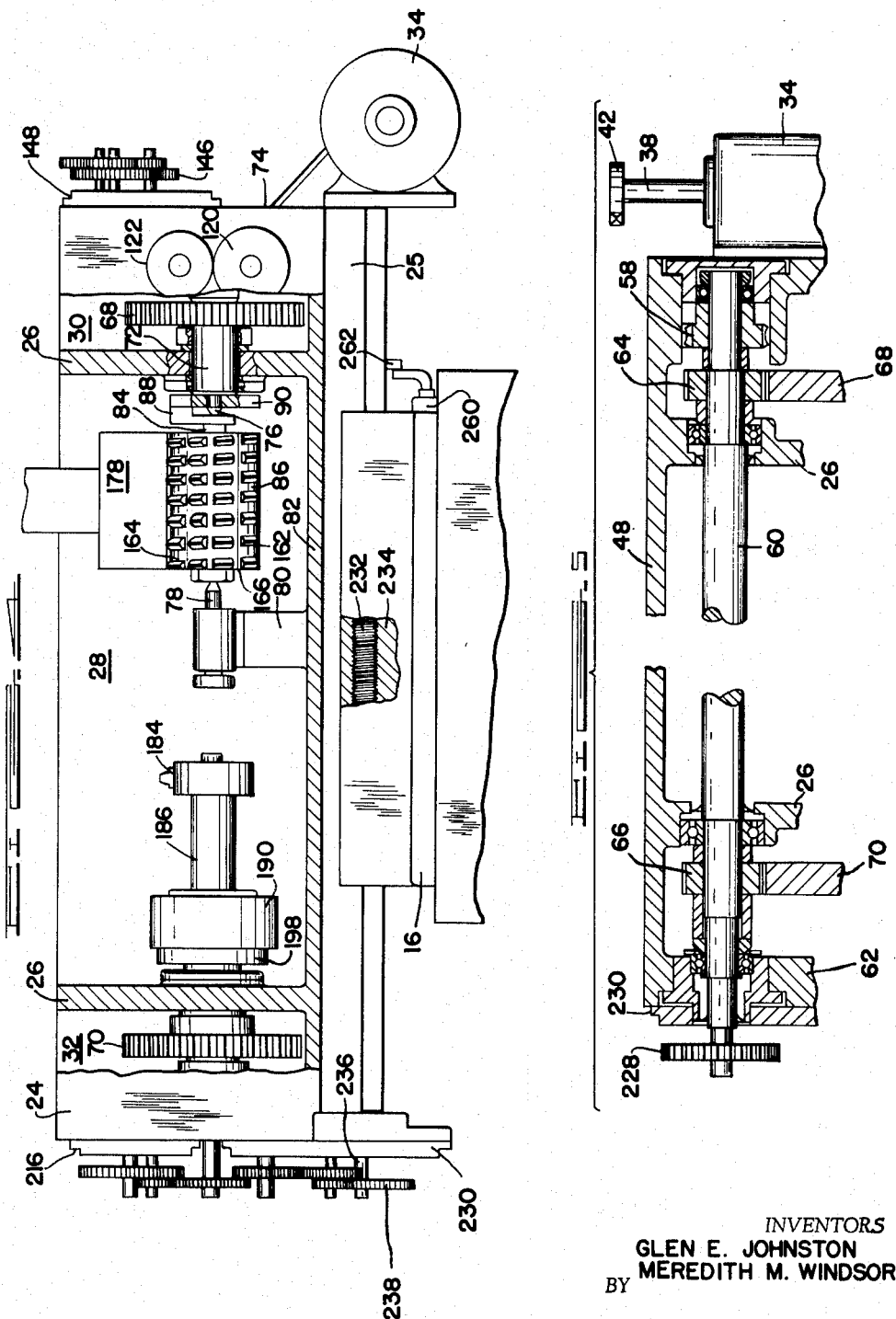

Sept. 7, 1965 G. E. JOHNSTON ETAL 3,205,335
METHOD AND APPARATUS FOR ACCURATELY
MACHINING HOBS AND THE LIKE
Filed June 18, 1962 4 Sheets-Sheet 3
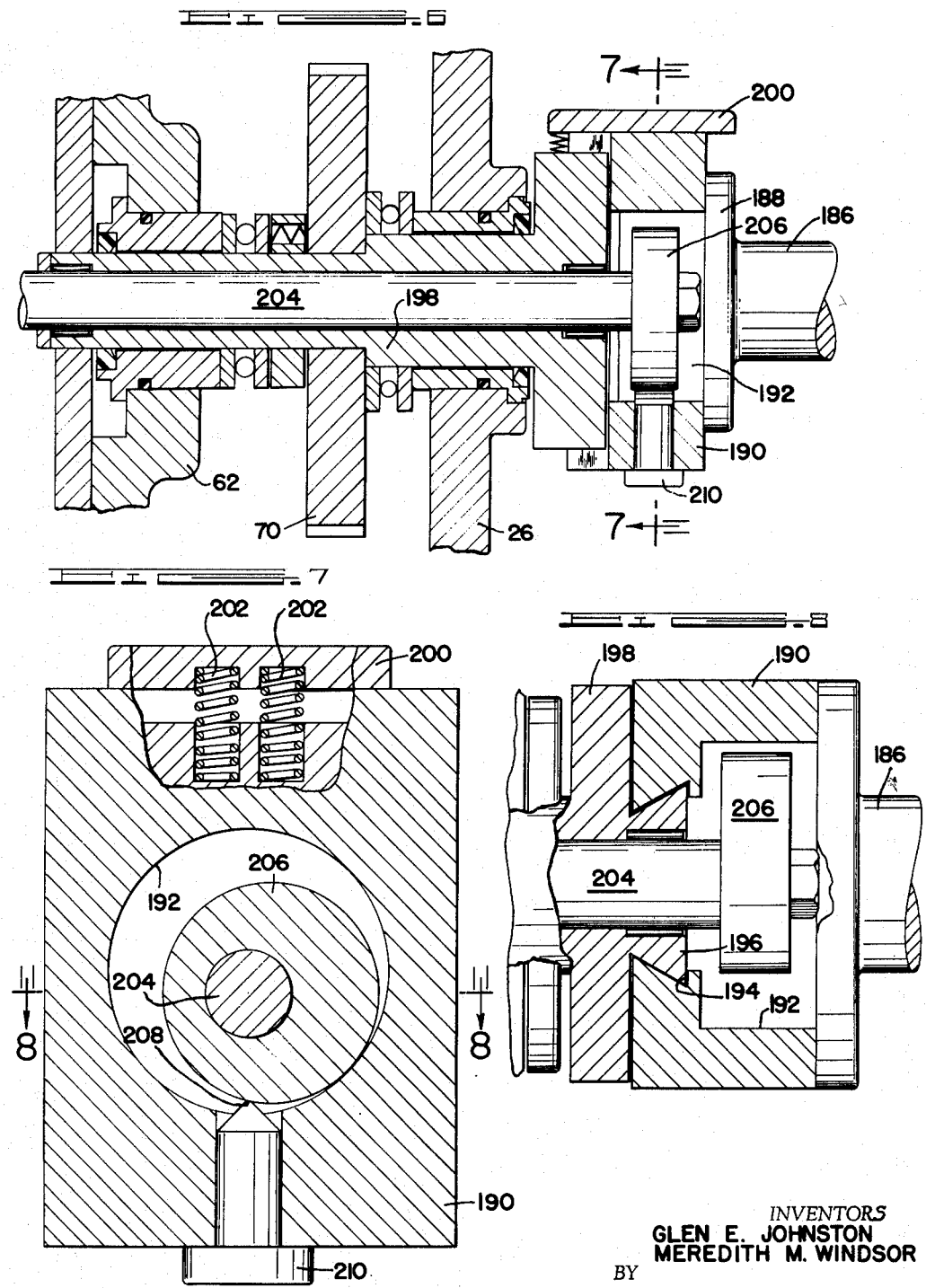
INVENTORS
GLEN E. JOHNSTON
MEREDITH M. WINDSOR
BY
OLSEN AND STEPHENSON
ATTORNEYS Sept. 7, 1965     G. E. JOHNSTON ETAL     3,205,335
METHOD AND APPARATUS FOR ACCURATELY
MACHINING HOBS AND THE LIKE
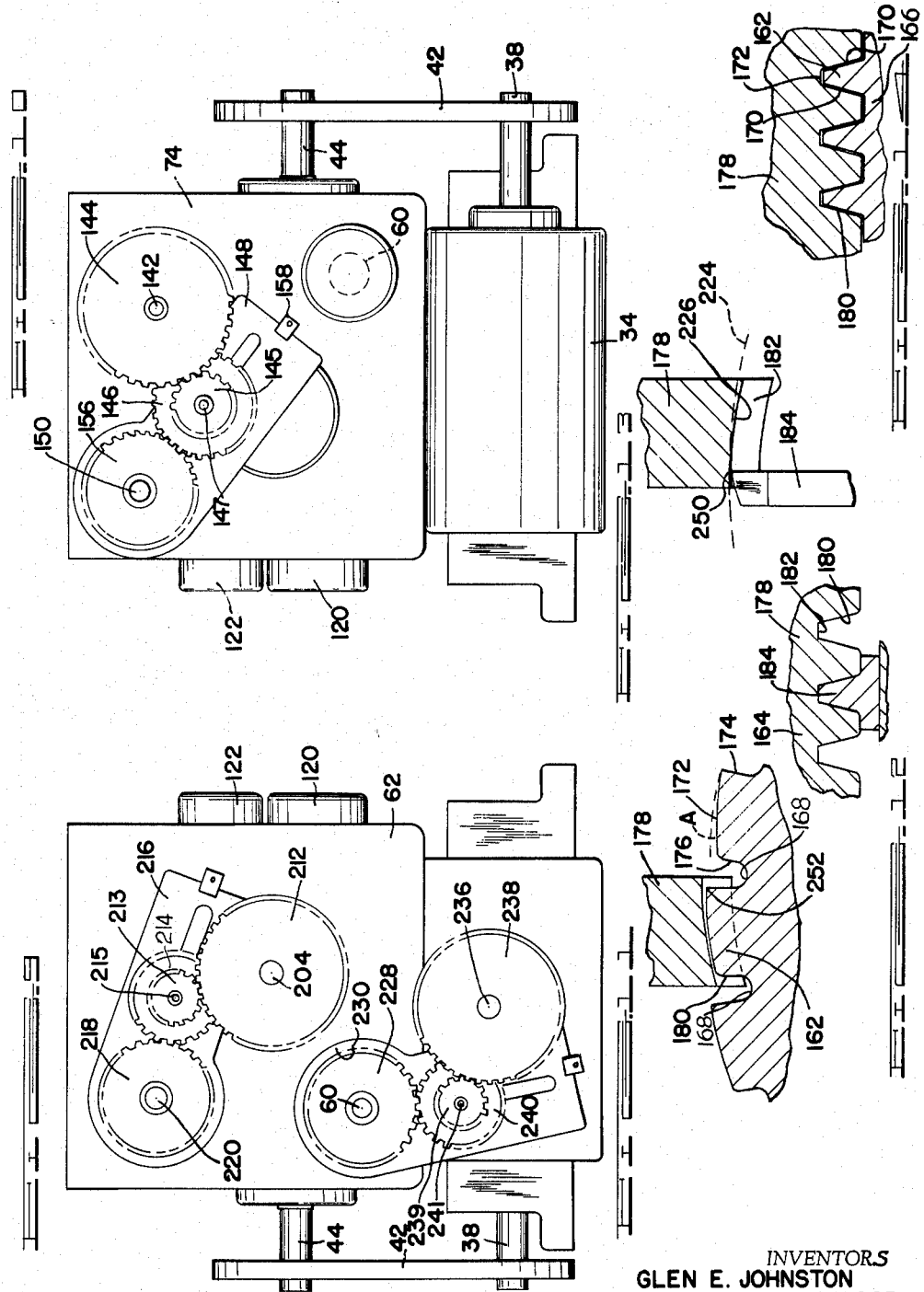
INVENTORS
GLEN E. JOHNSTON
MEREDITH M. WINDSOR
BY
OLSEN AND STEPHENSON
ATTORNEYS United States Patent Office 3,205,335
Patented Sept. 7, 1965

3,205,335
METHOD AND APPARATUS FOR ACCURATELY MACHINING HOBS AND THE LIKE
Glen E. Johnston, Birmingham, and Meredith M. Windsor, Detroit, Mich., assignors to Star Cutter Company, Farmington, Mich., a corporation of Michigan
Filed June 18, 1962, Ser. No. 203,241
9 Claims. (Cl. 219—69)

This invention relates generally to methods and apparatus for accurately manufacturing cutting tools and the like and more particularly to an improved method and apparatus which utilizes electrical discharge machining to accurately shape articles of this type.

The manufacture of cutting tools and similar articles having teeth or projections which are relieved so that their outer surfaces do not lie on a continuous circular arc are difficult to manufacture accurately because they cannot be machined by rotation with respect to a stationary cutter. It is an object of this invention, therefore, to provide an improved method and apparatus for accurately shaping articles of this type. In the method and apparatus of this invention, metal is removed from the article through the action of an electrical discharge of very short duration and high current density between an electrode and the work. The basic components of an electrical discharge machining system are well known and consist of an electrode, which can be formed of a variety of current conducting materials, the work, which is grounded, and a servo mechanism which maintains a very thin gap between the electrode and the work. The work is immersed in a fluid which is a non-conductor or poor conductor of electricity, as, for example, a light-oil, and is thus normally referred to as a dielectric fluid and when the voltage across the gap reaches a sufficiently high value, it starts to conduct locally and within a fraction of a second the condensers in the circuit connected to the electrode have been discharged through the gap. Because of the characteristics of the arc extending across the gap, it will no longer conduct current when the applied potential falls below a certain critical value, so that at this time the gap stops conducting and the condensers start to recharge. Each discharge removes small amounts of materials from both the workpiece and the electrode and the discharges are repeated thousands of times per second.

In the method and apparatus of this invention the electrical discharge machining process is adapted to the manufacture of articles such as hobs. A hob is a formed milling tool having a generally cylindrical body and a plurality of identical teeth which lie in a helical path about the circumferential surface of the body and are arranged in circumferentially spaced rows which extend generally longitudinally of the body. Each tooth must be very accurately shaped and has an arcuate outer edge which is relieved for clearance purposes so that it does not lie on an arc concentric with the axis of the hob. In this invention, a roughed-out hob, which in the case of a shallow toothed hob may consist of a fluted cylindrical body, formed by conventional machining or other suitable methods, is rotatably mounted in a dielectric fluid so that the hob can be indexed to positions in which each of the rows of teeth thereon is accurately aligned with an electrode which has a working surface formed to the inverse shape of the desired final shape of each row of hob teeth. Consequently, when the electrode is moved to a discharge position with respect to a row of roughed-out hob teeth, the row of teeth is machined to the desired final shape by the electrical discharge between the electrode and the hob.

As an incident to the removal of metal from the roughed-out hob to form a row of teeth of the desired final shape, the working surface of the electrode is also eroded. In this invention, a form tool is provided which is of a precise shape relative to the cross-sectional shape of the hob teeth for re-shaping the electrode to the shape required. The form tool is located in a predetermined position relative to the work and is moved through a predetermined path such that by periodically subjecting the working surface of the electrode to the action of the form tool, the working surface is maintained in the desired inverse shape.

It is a further object of this invention, therefore, to provide an improved method and apparatus for finish forming hobs of a precise shape with a minimum chance for human error or miscalculation.

Further objects, features and advantages of this invention will become apparent from a consideration of the following description, the appended claims, and the accompanying drawings in which:

FIGURE 1 is a perspective view of the apparatus of this invention, shown in assembly relation with conventional electrical discharge machining apparatus;

FIGURE 2 is a transverse sectional view of the apparatus of this invention;

FIGURE 3 is a fragmentary sectional view of the apparatus of this invention looking substantially along the line 3—3 in FIG. 2 at one end of the apparatus;

FIGURE 3A is a fragmentary sectional view corresponding to FIG. 3 at the opposite end of the apparatus;

FIGURE 4 is a front elevational view of the apparatus of this invention, with some parts broken away and other parts shown in section for the purpose of clarity;

FIGURE 5 is a sectional view looking substantially along the line 5—5 in FIG. 2;

FIGURE 6 is an enlarged fragmentary sectional view of a portion of the apparatus of this invention showing the drive mechanism for the form tool which maintains the electrode of a desired shape;

FIGURE 7 is an enlarged transverse sectional view of a portion of the apparatus of this invention looking substantially along the line 7—7 in FIG. 6, with some parts broken away for the purpose of clarity;

FIGURE 8 is a fragmentary sectional view looking substantially along the line 8—8 in FIG. 7;

FIGURES 9 and 10 are end views of opposite ends of the apparatus of this invention;

FIGURE 11 is a diagrammatic view illustrating the operative position of the electrode in the apparatus of this invention relative to one row of teeth in a hob being machined in the apparatus of this invention;

FIGURE 12 is a fragmentary sectional view of the electrode and the form tool used in the apparatus of this invention to maintain the working surface of the electrode of the desired shape;

FIGURE 13 is a diagrammatic view illustrating the movement of the form tool relative to the working surface of the electrode; and FIGURE 14 is a fragmentary sectional view illustrating the cross sectional shape of a row of hob teeth and the shape of the electrode for forming these teeth.

With reference to the drawing, the apparatus of this invention, indicated generally at 10, is illustrated in FIG. 1 in assembly relation with an electrical discharge machining device 12 which is of well known type and is therefore not described in detail herein. The device 12 includes a main frame 14 which carries a stationary support 16 having a guideway 18 formed therein and an electrode holder 20 which is mounted above the support 16 and is movable up and down, as desired, by a servo mechanism 22 which may take the form of a hydraulic cylinder assembly or the equivalent. Guidably mounted on the stationary support 16 is a longitudinally extending housing or container 24 having a base 25 which carries slide members 27 slidably fitted in the guideway 18. The housing 24 is provided with partitions 26 so as to divide it into a central chamber 28 which constitutes a tank, and a pair of smaller end chambers 30 and 32, which are filled with a lubricating fluid and provided with covers (not shown).

A constant torque electric motor 34 is mounted on a mounting plate 36 which is secured to and extended downwardly from one end of the housing 24. The motor 36 has a drive shaft 38 on which a sheave 40 is mounted and the sheave 40 has a V-belt 42 mounted thereon. A shaft 44, journaled in a bearing 46 carried by the housing rear wall 48 and a bearing 50 carried by an internal wall 52 in the chamber 30, carries a second sheave 54 and the V-belt 42 is also trained about the sheave 54 so as to drive the shaft 44 in response to rotation of the motor drive shaft 38. The shaft 44 carries a worm 56 which drives a worm gear 58 secured to a shaft 60 (FIG. 5) which is journaled in both end walls of the housing 24 and the partitions 26 and projects through one end wall 62 of the housing 24. The shaft 60, which is sometimes hereinafter referred to as the main drive shaft for the apparatus 10, has a pair of gears 64 and 66 secured thereto which are positioned in the chambers 30 and 32, respectively, and which mesh with larger gears 68 and 70, respectively. The gear 68, hereinafter sometimes referred to as the work drive gear, is secured to a shaft 72 which is journaled in the partition 26 and the other housing end wall 74. The shaft 72 projects through the partition 26 and carries a spindle 76 which is axially aligned with a spindle 78 mounted on a projection 80 formed on the housing bottom wall 82. The spindles 76 and 78 are adapted to support the arbor 84 which extends axially through and is secured to a roughed-out hob 86 to be finished in the apparatus 10. A dog 88 engages the arbor 84 and is secured to a face plate 90 on the shaft 72 so that on rotation of the shaft 72, the hob 86 is rotated about the axis of the spindles 76 and 78.

As shown in FIG. 2, a block 92 is rotatably supported on a reduced diameter portion 94 of the shaft 72 which functions as a bearing support for the block 92. The block 92 is formed with a through hole 96 which forms a guideway for a hollow stop pin 98 which is movable axially of the guideway 96. A block 100 closes the lower end of the guideway 96 and forms an abutment for a spring 102 which extends into the stop pin 98 and urges it in an upward direction. The block 92 also carries a pair of headed pins 104 and 106 which engage the terminal ends of a pair of pistons 108 and 110 which are slidably supported in cylindrical passages 112 and 114 formed in projections 116 formed on the housing front wall 118 and extended into the chamber 30. Circular disks 120 and 122 mounted on the front wall 118 have passages 124 and 126 formed therein so that they communicate with the passages 112 and 114 and are adapted to be connected to a source of air under pressure. When the pressure in the passage 112 is relieved, the pressure in the passage 114 moves the piston 110 to its position shown in FIG. 2 so as to move the block 92 to its position shown in FIG. 2.

When the pressure in the passage 112 is increased, the piston 108 is moved to the right to a stop position in which the shoulder 109 on the piston 108 engages one end of the passage 112. During this movement of piston 108, the block 92 is rotated about the shaft portion 94 in a counterclockwise direction to a position in which the stop pin 98 is inclined to the left as shown in broken lines in FIG. 2 and in which the spring 102 extends the stop pin 98 to a position in which a shoulder 128 thereon engages a stop block 130 which is loosely fitted on the pin 98 at the upper end of the guideway 96. In this position of the stop pin 98, it is out of the path of rotation of an index disk 132 which has a pair of cam lobes 134 and 136 formed thereon which terminate in notches having flat stop shoulders 138 and 140. The disk 132 is secured to a short shaft 142 journaled on the housing 24 in the chamber 30 and projected through the housing end wall 74. The shaft 142 carries a gear 144 (FIG. 10) positioned outside the housing and adjacent the end wall 74.

It can thus be seen that when the stop pin 98 is in its position shown in solid lines in FIG. 2, it is in the path of movement of the shoulder 140 on the index disk 132. When the pistons 108 and 110 are actuated so as to quickly move the pin 98 to its broken line position and then return it toward its solid line position the disk 132 will be allowed to rotate 180°, or one half of a revolution, with the pin 98 being urged against the cam lobe 134 by the piston 110, until the shoulder 138 engages the stop pin 98 and moves it downwardly in its guideway 96 to a stop position in which the lower end of the pin engages the block 100. Oil from the chamber 30 which flows into the cavity for the spring 102 through an opening 139 in the pin 98 cushions the downward movement of the pin 98 and thus cushions the shock applied to the disk 132 in stopping the rotation of the disk 132.

As shown in FIG. 10, the gear 144 which drives the drive shaft 142 for the index disk 132 is driven by a change gear 145 which is secured to a coaxial larger gear 146. The gears 145 and 146 are rotatably mounted on a shaft 147 which is adjustably secured to a gear quadrant 148, of well known type, which is loosely supported at one end on a shaft 150 (FIGS. 3 and 10) which is journaled in bearings 152 and 154 carried by a housing partition 26 and the end wall 74. A gear 156 secured to the shaft 150 meshes with the gear 146. The gear quadrant 148 is of the type commonly used for supporting change gears so that they can be interchanged with gears of different size to change the gear ratio between the shafts 142 and 150. A releasable locking member 158 on the end wall 74 is engageable with the gear quadrant 148 to maintain it in a moved position.

A gear 160 secured to the shaft 150 and positioned in the chamber 30 also meshes with the work drive gear 68. It can thus be seen that when the motor 34 is operating, the shaft 38 merely slips or stalls when the index disk 132 is prevented from rotating by its engagement with the stop pin 98, because when the shaft 142 is locked, the main drive shaft 60 is likewise locked. In other words, when the shaft 142 is held, the shaft 150 can likewise not rotate because it is gear connected to the shaft 142 by the change gears 144, 145, 146, and 156. Consequently, the shaft 72 is likewise prevented from rotating since the work drive gear 68 thereon meshes with the gear 160 which is held by the shaft 150. Engagement of the drive gear 68 with the gear 64 on the main drive shaft 60 prevents the shaft 60 from rotating.

On rotation of the block 92 to move the stop pin 98 out of engagement with the shoulder 140 on the index disk 132, the index disk 132 will rotate one half of a revolution until the shoulder 138 engages the stop pin 98 as previously described. The change gears 144, 145, 146 and 156 are of a predetermined size such that during this one half revolution of the disk 132, during which the shaft 72 is rotated to rotate the hob 86, the hob 86 is rotated a predetermined angular increment which is related to the position of the teeth 162 on the hob 86 as follows:

As shown in FIGS. 4 and 11, the hob 86 has a plurality of identical teeth 162 which are arranged in a helical path about the circumferential surface 164 of the generally cylindrical hob body 166. The teeth 162 are also arranged in rows which extend generally longitudinally of the hob body and are separated by flutes 168. Each row of hob teeth is spaced predetermined precise distances from the rows of teeth on adjacent sides thereof, and each tooth 162 is of a precise shape. In the illustrated hob, each tooth 162 has radially outwardly converging side walls 170 and an arcuate or cam shape outer edge surface 172. As shown in FIG. 11, the surface 172 is progressively relieved in a direction between the tooth front edge 174 and the tooth rear edge 176 so as to form a relief angle A.

In the initial setup of the hob 86 in the apparatus 10, one row of teeth 162 is vertically aligned with an electrode 178 mounted on the electrode holder 20 (FIG. 1). The electrode 178 may be formed of any suitable electric current conducting material, such as carbon, and is provided with a bottom or working surface 180 having a plurality of grooves 182 formed therein, each of which is of a precise shape in cross section corresponding to the desired final cross sectional shape of a tooth 162, and the number of grooves in the surface 180 is at least as great as the number of teeth in a row of teeth 162 on the hob 86. As a result, the surface 180 is substantially the inverse shape of the shape of a row of teeth 162 on the hob 86 so that when the electrode 178 is moved into operative relation with respect to a row of hob teeth, as shown in FIGS. 11 and 14, in which the teeth 162 project into the grooves 182 into a closely spaced relation with the surface 180, that row of teeth will be machined to the precise desired final shape for the teeth 162 on operation of the machine 12 to cause a spark discharge between the electrode and the hob 86. The hob 86 and the electrode 178 are connected to opposite terminals in the machine 12, in a well known manner, so that when an electrical potential is applied between the hob 86 and the electrode 178 the spark discharge is obtained across the gap between the hob 86 and the electrode 178 to effect the desired machining of the hob tooth surfaces 170 and 172.

The change gears 144, 145, 146 and 156 are of a size such that for each one half revolution of the index disk 132 the hob 86 is rotated an angular increment corresponding to the angular increment between the front ends 174 of the teeth 162 in adjacent rows so that on successive incremental rotations of the hob 86, successive rows of teeth 162 thereon are brought into vertical alignment with the electrode 178 so that successive rows of teeth can be machined.

As previously pointed out, each time the apparatus 12 is operated to provide for flow of current through the electrode 178, some of the material on the electrode surface 180 is eroded away. Consequently, in order to maintain the electrode surface 180 of a shape such that the grooves 182 therein correspond precisely to the desired final shape of the teeth 162, the electrode surface 180 must be periodically machined. In the apparatus 10 this machining is accomplished by providing a form tool 184 which is removably mounted on one end of a tool mounting bar 186 disposed in the tank 28. As shown in FIG. 6, the mounting bar 186 is provided at the opposite end with a flange 188 which is secured to one side of a block 190 having a horizontal opening 192 formed therein. The opposite side of the block 190 is formed with an undercut guideway 194 which is slidably supported on a diametrically extending dovetail shape guide member 196 (FIG. 8).

The guide member 196 is formed on the inner end of a tubular member 198 which is journaled in a housing partition 26 and the housing end wall 62 and projects through the chamber 32. The block 190 has an overhanging end wall 200 and springs 202 are engaged with and extend between the tubular member 198 and the radially inner side of the wall 200 so as to continually urge the block 190 in a radially outward direction. A shaft 204, extending axially through and rotatably supported in the tubular member 198, carries a cam 206 (FIGS. 6 and 7) which is positioned within the opening 192 in the block 190 and is engaged with the inner end 208 of a cam follower 210 mounted in the opposite end of the block 190 and projected into the opening 192.

During rotation of the cam 206 relative to the block 190, springs 202 maintain the inner end 208 of the follower 210 in continual engagement with the surface of the cam 206 so as to provide for a radially inward and outward movement of the block 190 which in turn provides for a similar movement of the tool 184 since it is mounted on the mounting bar 186 secured to the block 190.

The gear 70, which is driven by the gear 66 on the shaft 60, is secured to the tubular shaft 198 which drives the block member 190. Consequently, since the shaft 60 is rotatable only when the index disk 132 is rotatable, the tool 184 which is driven by the shaft 198 is also rotatable only at this time. The shaft 204 projects through the housing end wall 62 and has a gear 212 secured thereto and positioned in meshing engagement with a gear 213 which is secured to a co-axial larger gear 214. The gears 213 and 214 are rotatably mounted on a shaft 215 adjustably secured to a gear quadrant 216 like the quadrant 148 previously described. The gear 214 meshes with a gear 218 mounted on a shaft 220 (FIG. 3A) which supports the quadrant 216 and is journaled in a partition 26 and the end wall 62. The shaft 220 has a gear 222 secured thereto which meshes with the gear 70.

As will be hereinafter explained, the housing 24 is movable to a position in which the form tool 184 is vertically aligned with the electrode 178 so that the servo mechanism 22 can be operated to move the electrode 178 into a position in which the working surface 180 thereof is machinable by the tool 184. At such time, the tool 184 is aligned with the groove 182 at one end of the electrode 178 and the block 92 is moved to a position in which the stop pin 98 does not interfere with rotation of the index disk 132. The motor 34 operates to drive the main drive shaft 60 which in turn drives the tool mounting bar 186 by virtue of the meshing engagement of the gears 66 and 70. Rotation of the shaft 60 also causes rotation of the change gears 212, 214 and 218 so as to rotate the shaft 204 to provide for rotation of the cam 206 in a direction opposite to the direction of rotation of the block 190. The rotation of the cam 206 thus causes a radial movement of the tool 184 in addition to its rotary movement. The extent of radial movement is dependent on the size of the gears 212, 213, 214 and 218 since this arrangement determines the extent of relative rotation of the shafts 198 and 204.

As previously pointed out, each of the hob teeth 162 has an arcuate outer surface 172 which is relieved to the extent shown by the angle A in FIG. 11. In order to shape the surface 180 so that each of the grooves 182 has a corresponding relief, the tool 184 is made to travel in a path corresponding to the shape of the hob tooth outer surface 172. This precise path is obtained by selecting the change gears 212, 213, 214 and 218 of the proper size to obtain the desired radial movement of the tool 184 during each revolution thereof. This is illustrated diagrammatically in FIG. 13 in which a circular path for the tool 184 is indicated at broken lines at 224 and the path actually traveled by the tool 184 corresponds to the radial inner surface 226 formed in the groove 182. As shown by comparison of FIGS. 12 and 14, the tool 184 is of a shape in cross section corresponding exactly to the desired shape of a hob tooth 162. This shape of the tool 184 provides for the formation of the electrode working surface 180 of the precise inverse shape of the teeth 162.

The main drive shaft 60 projects through the housing end wall 62 and has a gear 228 secured thereto and a gear quadrant 230 like the quadrant 148 loosely mounted thereon. A threaded shaft 232 (FIG. 4) carried by the housing 24 and disposed below the housing bottom wall 82 extends through and is threadably engaged with a fixed nut 234 carried by the fixed support 16. One end 236 of the shaft 232 has a gear 238 secured thereto (FIGS. 4 and 9) and arranged in meshing engagement with a gear 239 which is secured to a co-axial larger gear 240. The gears 239 and 240 are rotatably supported on a shaft 241 adjustably secured to the quadrant 230 and the gear 240 is arranged in meshing engagement with the gear 228. As a result, on rotation of the main drive shaft 60, the shaft 232 is likewise rotated in the fixed nut 234 to move the housing 24 in a direction longitudinally thereof. The change gears 228, 238, 239 and 240 are of a size such that the longitudinal movement of the housing 24 corresponds to the lead on the particular hob 86 being machined in the apparatus 10. In other words, each time the index disk 132 is rotated to provide for indexing of the hob 86, the housing 24 is moved longitudinally a distance such that the next row of teeth 162 on the hob are vertically aligned with the grooves 182 in the electrode 178. Likewise, during rotation of the machine tool 184, the housing 24 is being moved in a direction longitudinally thereof at a rate such that the tool 184 automatically travels through successive grooves 182 in the electrode 178.

In the operation of the apparatus 10, the tank 28 is filled with dielectric fluid and the chambers 30 and 32 are filled with oil to lubricate the gears therein. The roughed-out hob 86 is positioned on the spindles 76 and 78 and the tool 184 is located so that its leading edge 250 is positioned in horizontal alignment with the lead tooth 162 in a row of teeth to be machined. The forward edge 250 of the tool 184 is positioned in horizontal alignment with the forward edge 252 of the lead tooth 162, namely, the tooth 162 to the extreme right or left, of the row of teeth to be first machined on the hob 86, depending on the lead of the hob 86. As used herein, the term "roughed-out hob" is inclusive of a cylindrical workpiece having flutes, like the flutes 168 formed therein, and the apparatus of this invention is operable to form the material between the flutes into rows of hob teeth. The above described alignment is accomplished by use of a line up bar (not shown) having a straight edge which is positioned within the tank 28 a known distance from the axis of the spindles 76 and 78 which are axially aligned with the shaft 204 which defines the axis of rotation of the tool 184. The housing 24 is moved longitudinally in a direction depending on the lead of the hob 86 during machining of the electrode surface 180.

The index disk 132 is then adjusted so that in this position of the hob 86, the disk 132 is in a locking position. The motor 34 is operated to move the housing 24 to a position in which the tool 184 is in vertical alignment with the lead groove 182 in the electrode 178. The servo mechanism 22 is operated to move the electrode 178 downward into engagement with the tool 184 so that rotation of the tool 184 across the electrode surface 180 provides for machining of the grooves 182 and the areas between the grooves 182 to the precise shape desired for the row of teeth 162. The electrode 178 is then raised and the motor 34 is operated to move the housing 24 to a position in which the teeth 162 in a row of teeth are vertically aligned with the grooves 182.

With the block 92 in a position holding the index disk 132 in an indexing position, in which the pin 98 is engaged with, for example the notch 140, to maintain the alignment of the row of teeth with the electrode 178, the electrode 178 is then lowered into operative position relative to the hob 86 and the machine 12 is operated to provide for electrical discharge machining of one row of teeth 162. The electrode 178 is then raised, the pistons 108 and 110 are actuated to release the index disk 132 and the motor 34 is operated to move the housing 24 longitudinally, during which time the electrode 178 is lowered into a position such that it will be machined during movement of the tool 184 across the surface 180. The motor 34 is then operated to return the housing 24 to substantially its initial position. This position is determined by actuation of a limit switch 260 which is engaged by a stop 262 carried by and movable with the housing 24. The switch 260 automatically adjusts itself, by means of a mechanism herein not disclosed since it forms no part of the present invention, to compensate for the lead on the hob 86 so that the motor 34 is stopped just before it returns to its original position in which position the next adjacent row of teeth 162 are substantially vertically aligned with the electrode 178. The motor is then operated to place a rotating force on the index disk 132 and the block 92 is rotated so that the pin engages the other notch 138, so that the next row of teeth is precisely aligned with the electrode 178. The electrode is then lowered to precisely machine the next row of teeth.

If desired, and in a preferred embodiment of the invention, following the precise machining of each row of teeth 162, the block 92 is rotated to release the index disk 132 just long enough to permit rotation of the disk 132 through one half of a revolution. This provides for alignment of the electrode 178, which at this time has its surface 180 eroded so that it is not of the precise desired shape, into alignment with the next row of teeth 162. In this connection it is pointed out that during indexing of the hob 86, the threaded shaft 232 is rotated in the nut 234 to automatically advance the hob 86 in an axial direction a distance sufficient to compensate for the lead of the teeth 162 to automatically align the adjacent row of offset teeth 162 with the grooves 182. The worn electrode is then moved into operative position with respect to the next row of teeth 162 to machine them to approximately the desired final shape. The housing 24 is then moved so that the electrode is machined by the tool 184 after which it is returned to the same row of teeth to finish machining that row of teeth, following which the hob 86 is indexed to give the next row of teeth a preliminary machining. This process is then repeated until all the rows of teeth 162 on the hob 86 have been finish machined so that the hob 86 is in condition for use.

It will be understood that the method and apparatus for accurately machining hobs and the like which are herein disclosed and described are presented for purposes of explanation and illustration and are not intended to indicate limits of the invention, the scope of which is defined by the following claims.

What is claimed is:

1. The method of electrical discharge forming a generally cylindrical workpiece having circumferentially spaced rows of identical teeth providing an electrode movable toward and away from said workpiece and having a grooved surface which is the inverse shape of the desired shape of a row of said teeth, moving said electrode toward said workpiece to a position in which said electrode surface is in operative position to form one of said rows to a predetermined shape, moving said electrode to a position spaced from said workpiece, rotating said workpiece, moving said electrode toward said workpiece to a position in which said electrode surface is in operative position to form another one of said rows, machining said electrode surface to maintain said inverse shape, moving said electrode toward said workpiece to a position in which said electrode surface is again in operative position relative to said other one of said rows, and immediately thereafter moving said electrode into operative position with respect to still another one of said rows.

2. In a process for manufacturing a hob, the steps comprising mounting a rough formed hob for rotation about its axis, mounting an electrode having a surface corresponding in shape to the desired final shape of a row of teeth extending longitudinally of said hob so that said electrode surface is movable toward said hob to an operative position adjacent a row of teeth in alignment therewith to electrically machine the teeth in said row to a predetermined shape, moving said electrode twice into operative position with respect to each row of teeth on said hob, machining said electrode surface between the two movements thereof with respect to each row of said teeth, rotating said workpiece and moving it longitudinally with respect to said electrode surface following the second machining of each row of hob teeth so as to align another row of hob teeth with said surface, and immediately thereafter moving said electrode into operative position with respect to said other row of hob teeth.

3. In a process for manufacturing a hob having a generally cylindrical body provided with a plurality of substantially identical teeth which lie in a helical path extending about the circumferential surface of the body, said teeth being arranged in a plurality of rows extending substantially longitudinally of said body and separated by flutes, each of said teeth having a cam shape outer edge and being of a predetermined length circumferentially of said body and being of a predetermined cross sectional shape in a direction longitudinally of said body, said process comprising the steps of providing an electrode having a working surface formed with a plurality of spaced grooves each of which has a shape in cross section corresponding to the desired shape in cross section of a hob tooth and each of which is of a length at least as great as said predetermined tooth length, mounting a roughed-out hob for rotation about the axis thereof, mounting a form tool having a shape in cross section corresponding to the cross sectional shape of a hob tooth in a coaxial relation with said roughed out hob, mounting said electrode for movement toward and away from said roughed-out hob for movement to a position in which said electrode surface is movable into electrical discharge machining relation with respect to at least some of the teeth in a row of hob teeth so as to form said teeth of said desired shape, moving said electrode and rotating said hob so that said electrode is moved into discharge machining relation with respect to the teeth in each row, moving said electrode and said form tool into operative positions prior to movement of said electrode into operative position with respect to each of said rows of teeth, and moving said form tool through a non-circular path in contact with said electrode so as to machine said grooves to said desired shape.

4. In apparatus for forming rotatable toothed workpieces by an electrical discharge machining process, a horizontally movable support, means on said support for rotatably supporting a workpiece having longitudinally extending rows of circumferentially spaced teeth for rotation about a substantially horizontal axis, an electrode having a surface of substantially the inverse shape of a plurality of teeth in a row on said workpiece, means mounting said electrode for movement toward and away from said axis, a form tool of substantially the same shape in cross section as a tooth on said workpiece, means mounting said form tool on said support for rotation through a non-circular path which is substantially coaxial with and fixed with respect to said workpiece, and said support being movable horizontally to move said workpiece and said tool with respect to said electrode to effect selective alignment of said electrode and said teeth and said electrode and said tool.

5. In electrical discharge machining apparatus which includes a fixed support and a substantially vertically reciprocally movable electrode holder, a housing mounted on said support for translatory horizontal movement relative thereto, motor means for moving said housing, means in said housing for supporting a hob having a generally cylindrical body and identical teeth on said body arranged in a helical path about the circumferential surface of the body and arranged in circumferentially spaced rows which extend longitudinally of the body, an electrode mounted on said holder and disposed above said hob, said electrode having a grooved surface which is the inverse shape of a row of said teeth, said motor means being actuatable to move said housing to a position in which a row of said teeth is in vertical alignment with said electrode surface, means driven by said motor means for indexing said hob to locate successive rows of the teeth thereon in vertical alignment with said electrode, a tool rotatably mounted in said housing at a position spaced longitudinally from said hob, said tool being of a cross sectional shape corresponding to the desired cross sectional shape of a hob tooth, means driven by said motor means for rotating said tool through a non-circular path substantially coaxial with said hob body concurrently with longitudinal movement of said housing, said motor means being actuatable to move said housing to a position in which said tool is in substantially vertical alignment with said electrode for machining said grooved surface thereof to the desired inverse shape of a row of hob teeth.

6. In electrical discharge machining apparatus which includes a fixed support and a substantially vertically reciprocally movable electrode holder, a longitudinally extending housing mounted on said support, coacting threadably engaged nut and screw means on said housing and said support, motor means on said housing for actuating said coacting means to provide for longitudinal movement of said housing, means in said housing for supporting a hob having a generally cylindrical body and identical teeth on said body arranged in a helical path about the circumferential surface of the body and arranged in circumferentially spaced rows which extend longitudinally of the body, an electrode mounted on said holder and disposed above said hob, said electrode having a grooved surface which is the inverse shape of a row of said teeth, said motor means being actuatable to move said housing to a position in which a row of said teeth is in vertical alignment with said electrode surface, means driven by said motor means for indexing said hob to locate successive rows of the teeth thereon in vertical alignment with said electrode, a tool rotatably mounted in said housing at a position spaced longitudinally from said hob, said tool being of a cross sectional shape corresponding to the desired cross sectional shape of a hob tooth, means driven by said motor means for rotating said tool through a non-circular path substantially coaxial with said hob body concurrently with longitudinal movement of said housing, said motor means being actuatable to move said housing to a position in which said tool is in substantially vertical alignment with said electrode for machining said grooved surface thereof to the desired inverse shape of a row of hob teeth, and gear means connecting said hob indexing means and said tool drive means with said coacting nut and screw means to provide for a longitudinal movement of said housing in response to each hob indexing movement and each rotary movement of said tool a distance corresponding to the lead of the teeth on said hob.

7. In electrical discharge machining apparatus for shaping a projection on a workpiece to a predetermined shape wherein said projection has side surfaces and a cam shape outer edge surface which extends between said side surfaces and wherein said projection lies on a helical path, a fixed support, an electrode mounted on said fixed support and having a groove provided with side surfaces and an edge surface extending between said side surfaces, said electrode groove lying on a helical path and being the inverse shape of said projection, a movable support mounted on said fixed support, a rotatable tool on said movable support for machining said electrode groove to maintain it of said shape, said tool having side surfaces shaped like said projection side surfaces and an edge extending between said side surfaces, means for moving said tool through a helical path in which said edge thereof follows a cam shape path corresponding to the shape of the outer edge of said projection, said means including a tool mounting bar supporting said tool, a hollow shaft, a block mounted on said shaft for in and out radial sliding movement and secured to said tool mounting bar, a cam shaft extending axially through said hollow shaft, coacting cam and cam follower means on said cam shaft and said block providing for sliding movement of said block in response to relative rotation of said shafts, means including a main drive shaft for relatively rotating said shafts, relatively rotatable nut and screw means on said fixed and movable support means, and means connected to and extending between said main drive shaft and said nut and screw means for providing for relative rotation thereof in response to rotation of said main drive shaft.

8. Apparatus for electrical discharge machining a hob to a desired final shape in a machine having a fixed support and an electrode holder movable up and down above said support, a housing having a tank portion adapted to contain a dielectric fluid and compartments at opposite ends of said tank portion, means guidably supporting said housing on said fixed support for substantially horizontal movement, a threaded shaft carried by said housing, a nut on said shaft mounted in a fixed position on said fixed support, means in said tank for supporting a roughed-out hob for rotation about a substantially horizontal axis, an electrode mounted on said electrode support and formed on the underside thereof with a plurality of helical grooves of the inverse shape of a row of hob teeth, a machine tool rotatably mounted in said tank in a substantially coaxial relation with said hob supporting means for engagement with said electrode to form said grooves therein, a main drive shaft on said housing, first drive transmitting means in one compartment for driving said hob supporting means from said main drive shaft, second drive transmitting means in the other compartment for driving said tool from said main drive shaft, motor means on said housing for driving said main drive shaft, and gear means connected to and extending between said main drive shaft and said threaded shaft for driving said threaded shaft in response to rotation of said main drive shaft.

9. Apparatus for electrical discharge machining a hob to a desired final shape in a machine having a fixed support and an electrode holder movable up and down above said support, a housing having a tank portion adapted to contain a dielectric fluid and compartments at opposite ends of said tank portion, means guidably supporting said housing on said fixed support for substantially horizontal movement, means in said tank for supporting a roughed-out hob for rotation about a substantially horizontal axis, an electrode mounted on said electrode support and formed on the underside thereof with a plurality of grooves of the inverse shape of a row of hob teeth, a machine tool rotatably mounted in said tank in a substantially coaxial relation with said hob supporting means for engagement with said electrode to form said groove therein, first drive transmitting means in one compartment for driving said hob supporting means, second drive transmitting means in the other compartment for driving said tool, and means for moving said housing horizontally on said fixed support.

References Cited by the Examiner

UNITED STATES PATENTS

| | | | |
|---|---|---|---|
| 2,481,255 | 9/49 | Stone | 74—424.8 |
| 2,560,475 | 7/51 | Rehnberg et al. | 74—116 |
| 2,725,690 | 12/55 | French | 51—122 |
| 2,778,925 | 1/57 | Gross et al. | 219—69 |
| 2,885,529 | 5/59 | Nelson | 219—69 |

FOREIGN PATENTS

| | | |
|---|---|---|
| 1,202,526 | 7/59 | France. |

RICHARD M. WOOD, *Primary Examiner*.